MULTIPHASIC MEDICAL SCREENING SYSTEM

Original Filed Sept. 12, 1968 6 Sheets-Sheet 1

INVENTORS
EDWARD B. RAWSON
DANIEL B. SCHWARZKOPF
JOSEPH B. FERGUSON
JAY H. BALL
BY Joseph Weingarten
Kelly M. Thompson
ATTORNEYS

MULTIPHASIC MEDICAL SCREENING SYSTEM

Original Filed Sept. 12, 1968 6 Sheets-Sheet 2

INVENTORS
EDWARD B. RAWSON
DANIEL B. SCHWARZKOPF
JOSEPH B. FERGUSON
JAY H. BALL
BY
ATTORNEYS

SCANNER CONTROL WORD FORMAT

| | |
|---|---|
| Bit 0 | INTERRUPT UNCONDITIONALLY AT RECEIVE TIME |
| Bit 1 | STATION BUSY |
| Bit 2 | OUTPUT FIRST WORD |
| Bit 3 | STORE FIRST INCOMING WORD |
| Bit 4 | OUTPUT SECOND WORD |
| Bit 5 | STORE SECOND INCOMING WORD |
| Bit 6 | RUN ALARM |
| Bit 7 | BLOCK TRANSFER IN PROGRESS |
| Bit 8 | BLOCK TRANSFER COMPLETE |
| Bit 9 | WORD LENGTH |
| Bit 10 | SPARE |
| Bit 11 | SPARE |

FIG. 3

INVENTORS
EDWARD B. RAWSON
DANIEL B. SCHWARZKOPF
JOSEPH B. FERGUSON
JAY H. BALL
BY Joseph Wingate
Stanley M. Schurgin
ATTORNEYS

MULTIPHASIC MEDICAL SCREENING SYSTEM

Original Filed Sept. 12, 1968 6 Sheets-Sheet 4

INVENTORS
EDWARD B. RAWSON
DANIEL B. SCHWARZKOPF
JOSEPH B. FERGUSON
JAY H. BALL
BY Joseph Weingarten
Stanley M. Schwarz
ATTORNEYS

STATION-BOUND LINE DATA WORD FORMAT

COMPUTER-BOUND LINE DATA WORD FORMAT

INVENTORS
EDWARD B. RAWSON
DANIEL B. SCHWARZKOPF
JOSEPH B. FERGUSON
JAY H. BALL
BY
ATTORNEYS

MULTIPHASIC MEDICAL SCREENING SYSTEM

Original Filed Sept. 12, 1968 6 Sheets-Sheet 6

INVENTORS
EDWARD B. RAWSON
DANIEL B. SCHWARZKOPF
JOSEPH B. FERGUSON
JAY H. BALL
BY
Joseph Wingate
Stanley M. Schwarz
ATTORNEYS United States Patent Office Re. 27,580
Reissued Feb. 6, 1973

27,580

MULTIPHASIC MEDICAL SCREENING SYSTEM

Edward B. Rawson, Lincoln, Daniel B. Schwarzkopf, Stow, Joseph B. Ferguson, Harvard, and Jay H. Ball, Natick, Mass., assignors to Searle Medidata Inc.

Original No. 3,566,365, dated Feb. 23, 1971, Ser. No. 759,389, Sept. 12, 1968. Application for reissue Feb. 10, 1972, Ser. No. 225,344
Int. Cl. G06f *15/02, 15/42*
U.S. Cl. 340—172.5 16 Claims

Matter enclosed in heavy brackets [ ] appears in the original patent but forms no part of this reissue specification; matter printed in italics indicates the additions made by reissue.

ABSTRACT OF THE DISCLOSURE

A multiphasic medical screening system in which medical data concerning a patient is derived by suitable transducers and transmitted and processed in real time to produce a medical history and work-up of the patient. A plurality of testing stations are provided, each implemented to conduct a particular test or tests, and the stations are selectively polled by a central processor to communicate data to the stations and to receive data from the stations.

FIELD OF THE INVENTION

This invention relates to data processing systems and more particularly to real time systems for collecting and processing medical data from a plurality of remote sources.

BACKGROUND OF THE INVENTION

In the mass medical examination of patients, for example in an out-patient department of a hospital or in a clinic, considerable time is expended in taking a patient's history and in performing the usual medical tests from which a patient's medical condition can be diagnosed. A physician or at least a skilled medical interviewer is usually preferred to take the medical history and record the patient's responses to questions on a suitable form, and similarly skilled personnel are required in performing and documenting the several medical tests taken during an examination. The results of the many tests must then be collated and documented for each patient so that the physician will have a full medical history and work-up of the patient for his consideration and diagnosis. Considerable time is spent in recording, assembling and transferring information concerning each patient, which time could better be spent on other activities requiring the skill of the personnel involved.

With the advent of modern data processing techniques it would be advantageous to automate the data recording and processing of information to eliminate, as much as possible, the manual handling of such data. Some semi-automated systems have been proposed wherein patient data is recorded in machine usable form, such as punched cards, for processing by computer and storage or print-out of the patient's medical record. While such systems offer some saving in time and manpower, they have not provided a real time processing capability and have been of interest mainly for archival recording of medical data. It is an object of the present invention to provide an on-line data processing system in which medical data is derived and processed in real time to provide a record of a patient's medical history and test results, which is immediately available for use by a physician in diagnosis and health screening.

SUMMARY OF THE INVENTION

In brief, a multiphasic medical screening system is provided in which medical data concerning a patient is derived by suitable transducers and transmitted and processed in real time to produce a medical history and work-up of the patient for use by a physician. The system employs a plurality of testing stations each implemented to conduct a particular test or group of tests and to communicate the data derived from these tests to a central processor. Each station is polled at a predetermined rate and for a predetermined time interval by the processor, at which polling time data is transferred by that station to the processor. In certain instances, instructions from the processor may also be transmitted to the station during its polling time to govern station operation. Since the polling rate is usually relatively high, the stations are essentially always on-line, and real time communication between each station and the central processor is, therefore, provided. Each station can be selectively monitored and controlled by the processor in accordance with particular test requirements or results, thereby affording an extremely efficient and versatile system. Each station is periodically checked by the processor to verify station operability. In addition, test results from the stations are examined by the processor to detect data outside of predetermined limits which may be caused by erroneous or deceptive data entry or by equipment malfunction. The processor also directs the inclusion of selective tests in a patient's testing routine depending on data previously taken, and provides patient routing instructions in accordance with the patient traffic at the respective stations.

Considering a typical system in more detail, a plurality of on-line stations are provided and several typical stations will be briefly discussed hereinbelow. At the first station, a medical history is taken by means of a programmed question and answer format wherein questions are presented which are responsive to particular answers given by the patient. Thus, a particular line of inquiry can be extended as required by the patient's answers. All answers are stored, formatted and printed out at a predetermined time in narrative or other form for use by the physician. The next several stations are operative to perform the tests usually required during a physical examination. At station two blood and urine samples are taken and tested at an associated laboratory, either by an automatic analyzer or by usual laboratory analysis, and the results reported to the central processor for recording. An electrocardiogram is taken and blood pressure measured at station three. The cardiogram can be interpreted by computer and is also available in chart form for study by the physician. At station four, the intra-ocular pressure is measured by a tonometer and the results transmitted to the processor. Spirometry measurements are taken at station five to measure the forced vital capacity and the timed vital capacity of the lungs. Anthropometric measurements are made at station six and include height, weight, skin fold thickness and left-right and front-back weight distributions. At station seven, visual acuity is tested and the results reported to the processor, and at station eight auditory acuity is measured and similarly reported. The equipment at each of these stations can be suitably automated so that the measurements are automatically transduced and encoded for presentation to the central processor. Other medical testing procedures can be conducted in an off-line manner and the results later incorporated into the patient's medical record. Typically such procedures include a chest X-ray and Papanicolaou smear.

Each station includes a station console which contains the necessary controls and indicators for implementation of the particular test, one or more test transducers for converting the test information into usable signal form, and a transceiver which is operative to encode the transduced test data for transmission to the central processor and to receive information from the processor. The central processor includes a computer and a scanner, the scanner being connected by means of a transmission path to all stations of the system. The scanner sequentially transmits messages including addresses of the several stations, and each station, upon recognition by its respective transceiver of its address, is enabled and is then momentarily communicative with the scanner. In this manner, each station is sequentially coupled on-line to the scanner for the transmission of information to the station from the processor and from the station to the processor. It is a particular feature of this invention that each station is continuously checked to ascertain that it is properly operating and that valid data is being presented. Such self-checking is accomplished in the following manner. In the event that a station recognizes its address but that station does not have information to convey to the processor, the received address or other identifying signal is retransmitted by the station to the processor and the returned message is examined in the processor to verify station operability. Failure to return the identifying signal signifies station inoperability.

DESCRIPTION OF THE DRAWINGS

The invention will be more fully understood from the following detailed description, taken in conjunction with the accompanying drawings, in which:

FIG. 3 is a diagrammatic representation of the scanner control word format;

DETAILED DESCRIPTION OF THE INVENTION

Figure 1:
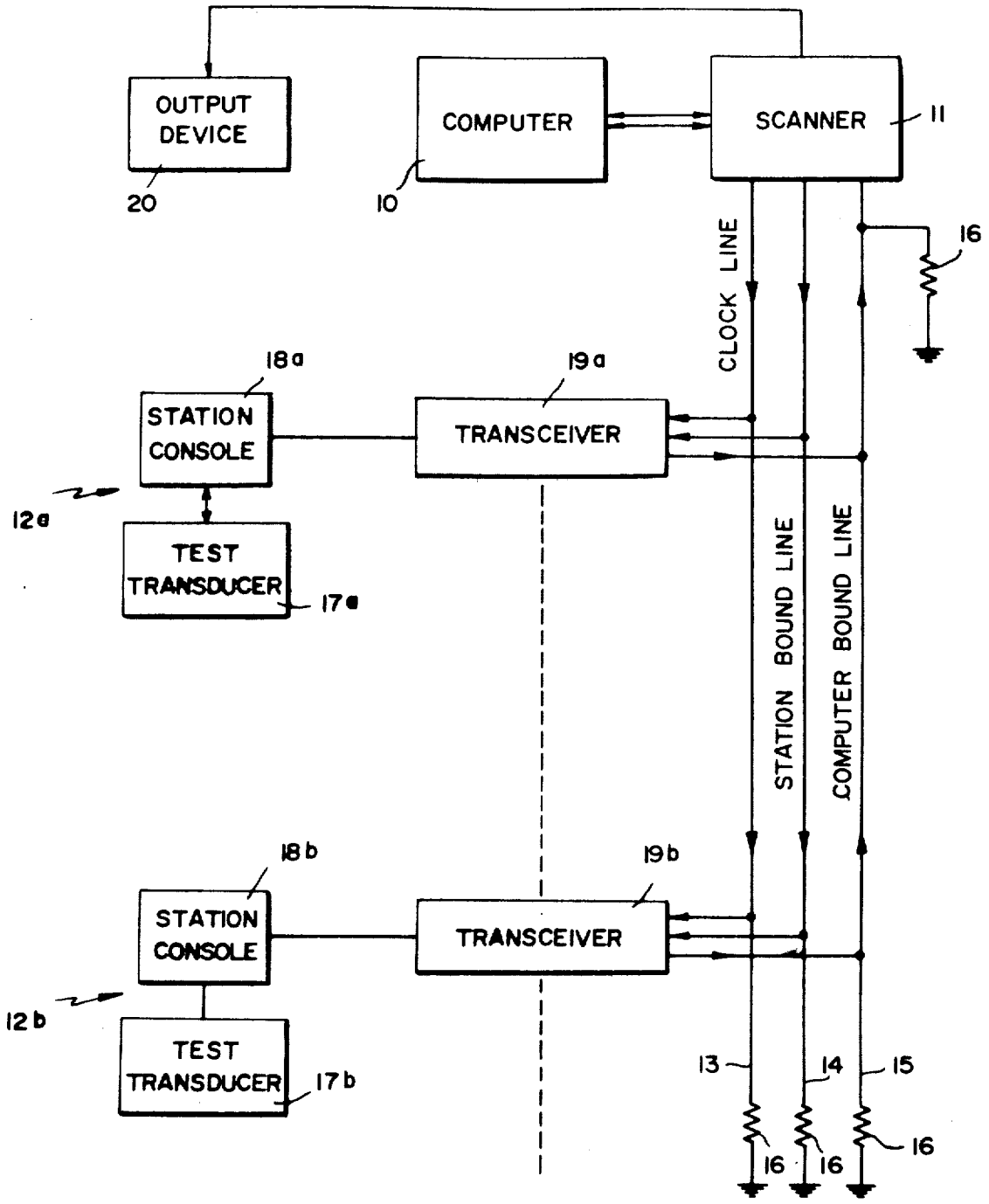
FIG. 1 is a diagrammatic representation of a medical screening system according to the invention.

To illustrate the facility with which medical data can be acquired and processed in a clinic or other center employed in the mass screening of patients, the operation of the invention will now be described prior to discussion of the system itself. In physical configuration, each testing station is usually in a separate room or cubicle with the cubicles arranged such that a patient can proceed in orderly fashion from station to station. The system may be set up within a building, or a portable system can be provided by installation in a van or trailer. Upon entering the installation, each patient is given a patient identification means, which typically is in the form of a small coded card about the size of a conventional credit card. This card, containing the coded patient identification, can be inserted into the console at each test station so that the test data obtained at a station is always associated with a particular patient. The console can be activated by insertion of the patient identity card into a card reader so that the station is not operative in the absence of such an identity card. To permit the orderly routing of patients to the several stations of the system, the central processor can provide queuing instructions to the several stations so that a patient at each station is suitably directed to his next test.

The medical history of an individual is taken at a test station provided for the purpose which has a display console operative to present questions to the patient, which questions can be answered by depression of one or more answer buttons. Depending on the patient's answer to a particular question, further questioning on a particular subject may continue or questions directed to another topic may be presented, as the situation requires. For example, if the patient, in response to the question "Do you smoke?" answers "No," then the question routine proceeds to the next question. If, however, the patient answers "Yes," then further questioning may proceed, such as "Do you smoke cigarets?" and "How many?" and so forth. Also, questions such as "Do you have coughing spells?" may be asked in response to a positive answer to the original question of the group. Thus, the history of the patient is developed in the detail required in view of his responses to the basic questions. It will be appreciated that the history taking is completely automated and the services of a skilled interviewer are, therefore, not required. Moreover, questions may be presented in any language to accommodate the native tongue of the patient, or in pictorial form for children or illiterates. After completion of the history taking, a suitable display indicates the station to which the patient should proceed. The history taking will normally require more time for completion than the medical measurements performed at the other stations; therefore, a plurality of history taking stations can be provided in the system depending on the patient load.

At the other test stations, the medical tests normally required during an examination are performed. At an audiometry station, the patient's hearing is tested using, for example, an audiometer modified to provide a coded output representative of the measured hearing levels at various frequencies. Visual acuity is measured at another test station, using a Bausch and Lomb Ortho-Rater or other similar instrument for measuring near and far acuity and phoria, as well as depth and color perception. Coding of the patient's responses to the visual acuity test is accomplished by a push button console by which the patient or an attendant can enter test data for subsequent processing. The forced vital capacity and the timed vital capacity of the lungs are measured at a spirometry station by means of a spirometer which is automated to provide direct data input to the data processing system. Anthropometric measurements are made at another test station by automated apparatus. The patient's height, weight and skin fold thickness are measured by suitable apparatus, and, in addition to the conventional weight measurement, the patient's front-back and left-right weight distributions are measured to provide data useful in evaluating the patient's physical balance and stability. At a tonometry station, the intraocular pressure of the eye is measured by a direct reading tonometer such as a modified Mackay-Marg tonometer to provide test results useful in the diagnosis of glaucoma.

An electrocardiogram is taken at another test station for subsequent evaluation by the physician. This cardiogram can also be analyzed by computer and the results processed along with other test data concerning the patient. Blood pressure is also measured and the results entered into the system. At a further test station the usual blood and urine samples are taken for analysis either by an automtaic analyzer or by manual laboratory tests.

After completion of the tests on a patient, his history and the test results are displayed in a suitable format for use by the diagnosing physician. Since an on-line system is employed, except for those tests requiring off-line procedures, a test summary and history can be provided to the physician for discussion with a patient promptly following his examination. The medical data is, of course, also available for for archival storage, as may be desired.

The overall system is illustrated in FIG. 1 and includes a central processor comprising a computer 10 and a scanner 11, and a plurality of remote stations, two stations 12a and 12b being illustrated. An output device 20, such as a teleprinter, is provided for printout of date under control of scanner 11. Computer 10 is interconnected with scanner 11 to provide information to and receive information from the scanner. The computer is operative only when commanded by scanner 11 to process data and, therefore, a relatively small computer, such as a Digital Equipment Corporation PDP–81, can suffice for the system. System connection to the stations is made via three communications lines 13, 14 and 15 which are connected to scanner 11 and which are terminated by suitable loads 16. Each station is connected to the central processor by means of these three communications lines, and the transmission system is such that any reasonable number of stations can be interconnected within the system without undue loading. Line 13 is a clock line for providing clock pulses to the stations, line 14 is a station bound line for providing messages to the stations, and line 15 is a computer bound line for conveying information from the stations to the computer 10. The clock and data signals are pulse signals and are formatted such that data is recognized as a data pulse occurring in time between two clock pulses, while synchronization is determined by the presence of two data pulses occurring between two clock pulses. Communications lines 13, 14 and 15 typically are coaxial cable to provide a wideband, relatively noise free transmission system.

While the illustrated embodiment employs three transmission lines as a transmission path between the scanner and the stations, other transmission links are also usable to convey the system clock and data signals. The system may be linked by radio or by hard lines and the particular implementation will, of course, depend upon the signal format employed and the required system performance. For example, voice grade telephone lines can be employed between one or more stations and the scanner. In certain instances, for example in a high data rate station or when several stations are on-line, the data rate may be adjusted to operate within the narrower bandwidth of such lines. Bandwidth limitation can be accomplished by employing a slower data rate in the system or by suitable buffering of data before its transmission over the telephone lines. A particular advantage of the present transmission system is that transformer coupling can be employed to eliminate ground loop problems. The coaxial transmission lines are grounded at the scanner end only and each station is locally grounded and transformer coupled to the transmission lines. There is no direct connection between the stations and the transmission lines and, thus, any potential differences which may exist within the system do not affect station operation or safety.

Stations 12a and 12b, as well as other similar stations connected to the system, include a test transducer 17, a station console 18, and a transceiver 19. Each station is operative to provide a selected medical test, to record test results, and to convert the test results into digital form for transmission to and processing by computer 10. Test transducer 17 provides information concerning the results of a particular medical test with which the transducer is associated. Station console 18 includes control means for patient or operator entry of information concerning test results and may contain display apparatus for interrogating or otherwise testing a patient. Information derived from the medical test conducted at each station is converted into digital form for transmission by transceiver 19 to scanner 11 and thence to computer 10 for processing. Transceiver 19 is also operative at certain stations to direct information from the computer and scanner to the station equipment to govern station operation and provide display of information useful to the patient or station operator.

The station equipment will vary in detail depending upon the particular test to be conducted at each station. In general, the stations are of three broad classes. In one class of station, questions are propounded for answer by a patient and further questioning will be conducted in accordance with the patient's responses. For such a class of station, the scanner continuously communicates with the station during a testing sequence since information must be controlled by the computer for display at the station and the station must relay answers back to the computer to govern the subsequent control of the questioning process. In the present system, an automatic medical history taker is employed which operates in this manner. A second class of station employs analog transducers, the outputs of which are converted to digital form for transmission to the computer for processing. This class of station is used for example in tonometry, anthropometry and autoanalysis of body fluids. The third class of station employs a manual switch array where data is entered into the system in digital form by switch settings. This third class of station is employed for example in hearing and vision testing.

The remote stations are polled by scanner 11 in an order and at a rate which can be chosen to suit particular system requirements. Scanner 11 transmits, on station bound line 14, messages which include the address and message for each station in the system. All stations are continuously on line; however, a station is not enabled until its unique address is recognized by the transceiver 19 of that station. Thus, each station is successively enabled by recogntion of its address and is operative to receive instructions from computer 10 and/or to relay information to computer 10. An important feature of the present system is the self-checking which is accomplished continuously during system operation. During each time a station receives its address and this station has no information to report to computer 10, this station address is redirected back to computer 10 via scanner 11 to provide a station operability check. In this manner, the operability of each station in the system can be continuously monitored and a faulty station can be promptly detected so that repairs can be made or an alternate station switched into the system.

Figure 2:
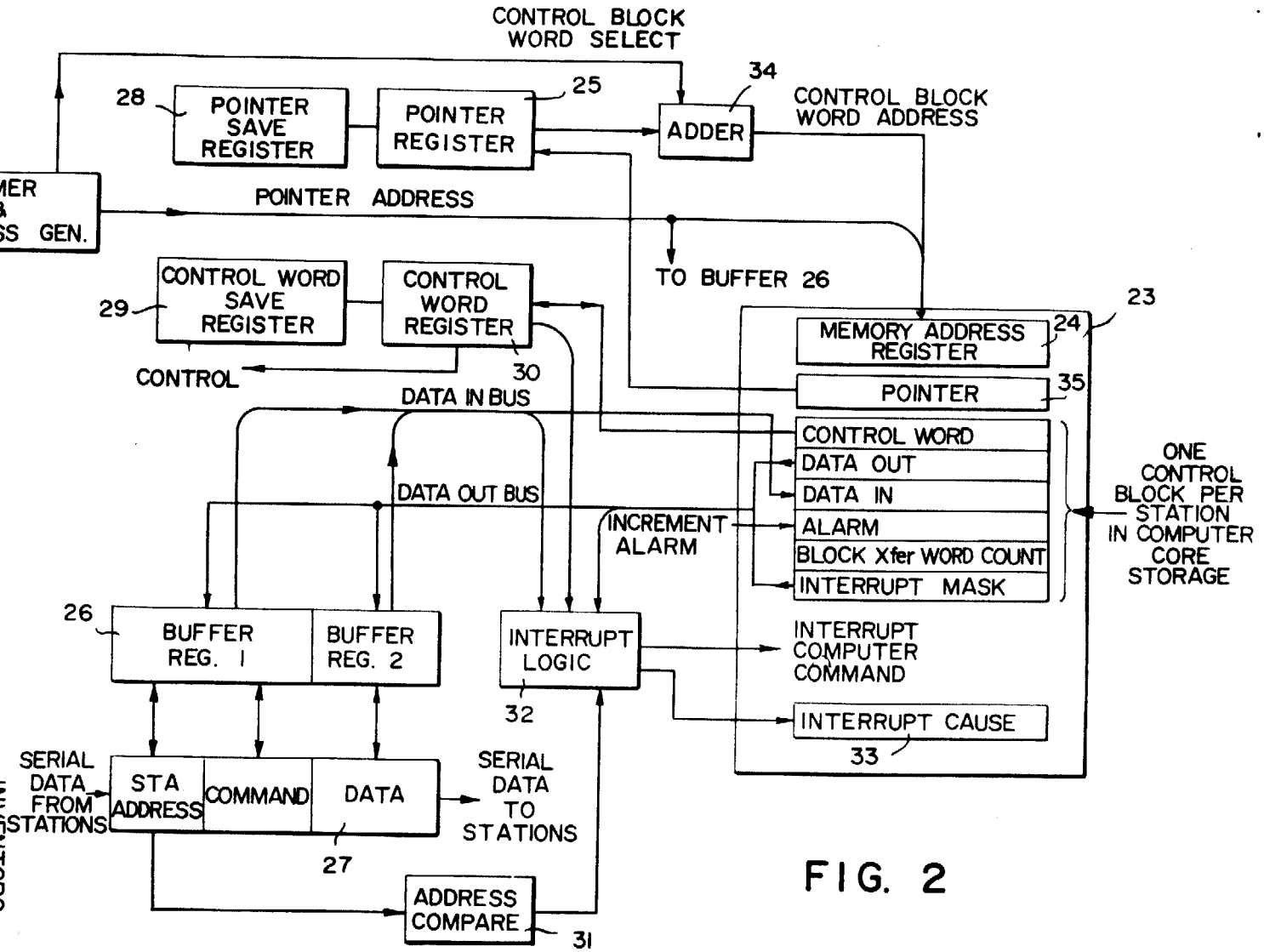
FIG. 2 is a block diagram of the scanner of FIG. 1.

Central control of the system is accomplished in major part by scanner 11 and this scanner will now be described in conjunction with FIG. 2. In general, the scanner is operative to address each station, to govern the operation of each station, and to ascertain station operability, as well as decoding information returned to the scanner by the station. Referring to FIG. 2, timer and address generator 22 generates sequentially the addresses of the several stations in the system, and also provides clock pulses to the stations. The sequence of operation for each station is generally the same and a typical operating sequence proceeds as follows. A control block 23 in the computer memory is provided for each station, and each control block has a list of words for its station which controls that station operation and the operation of the scanner.

The appropriate control block corresponding to a particular station is accessed in the following manner: Timer 22 generates a pointer address which in certain instances is itself the station address. Using a computer input-output channel for direct memory accessing, a station pointer address is entered into the computer memory address register 24 and the pointer is transferred from the computer core memory location 35 specified by the pointer address, to activate pointer register 25. This pointer now becomes the base address for retrieving subsequent words from the control block. The address of a word in the control block is generated by summing, in adder 34, the pointer and a word select command also generated by timer 22.

In this manner the scanner first acquires the control word and stores it in register 30. All subsequent actions necessary for preparing the transmitted station message are controlled by the bits in the control word, the format of which is shown in FIG. 3. For instance, if the computer has data for the station, this would be indicated by a ONE in bit 2. The data output word would be acquired and stored in buffer register 26 and at the appropriate time, it would be transferred to the shift register 27. In like manner the scanner would fetch other words from the control block. If bit 6 in the control block is a ONE, the scanner would increment the alarm word in the control block. If overflow occurred, the scanner would cause a computer interrupt.

As a message is being shifted out of shift register 27 to the station, a received message is being shifted into the shift register for processing by the scanner. After receipt of an incoming message by shift register 27, it is transferred to buffer register 26 for processing by the scanner. The pointer and control word are retrieved from their respective save registers 28 and 29 and are stored respectively in pointer register 25 and control register 30. If no message has been sent from the station to the scanner, the station automatically returns the message which has been sent to that station by the scanner. In this event the received station address is compared with the transmitted station address to verify station validity. Comparison of the transmitted and received station addresses is accomplished in the address comparison circuit 31. If the addresses do not compare, interrupt logic 32 is energized to suitably interrupt computer operation and, if desired, operate suitable alarm indicators to denote the cause of the interrupt, station identity and location.

If the computer requires data from the station, bit 3 and bit 5 of the control word would be set. Sensing these bits, the scanner would store the first and second input words in the appropriate places in the control block. If the station has a message for the computer, the station enter flag would be set, the received message would be stored in the control block and a computer interrupt would be generated.

Block transfers of data to or from a station are accomplished using the computer direct memory accessing facility. The computer commands a block transfer by setting bit 7 in the control word. At completion of the block transfer, as indicated by word count overflow, the scanner sets bit 8 thereby inhibiting block transfer action with the station.

The logic circuitry in the scanner provides interrupt signals for the computer in the event that any of the following conditions exist:

(a) a received address does not compare with a transmitted address of that station.
(b) a station enter flag has been set.
(c) a block transfer has been completed.
(d) the computer requests an interrupt by setting bit 0 in the control word.

Before interrupting the computer, the scanner stores the cause of interrupt in a specified core location 33. The computer may inhibit various interrupts by setting appropriate bits in the interrupt mask which are examined by the scanner before initiating interrupt action.

As described hereinabove, a particular station has been addressed and data has been transferred to and received from the station. The scanner is now in condition to interrogate the next station, the address of the next station to be interrogated being selected by timer 22 and the operating sequence continuing as hereinabove.

The control word format of the scanner is illustrated in FIG. 3. In the system being described a 12 bit control word is employed with each bit having the function indicated in FIG. 3. The presence of a logical ONE in any of the bit positions indicates the occurrence of a condition associated with that bit position. Thus, the presence of a ONE in bit position zero causes an unconditional computer interrupt, bit position one is a busy bit, bit two causes transmission of the first message word, bit three causes the storage of the first incoming message from a station, bit four controls transmission of the second message word to the station, bit five controls storage of the second incoming message from the station, bit six controls an alarm indicator, bit seven indicates that a block transfer is in progress, bit eight indicates that a block transfer is complete and bit nine indicates the word length. The tenth and eleventh bit positions are spare positions which may be utilized in an alternative system.

Figure 5:
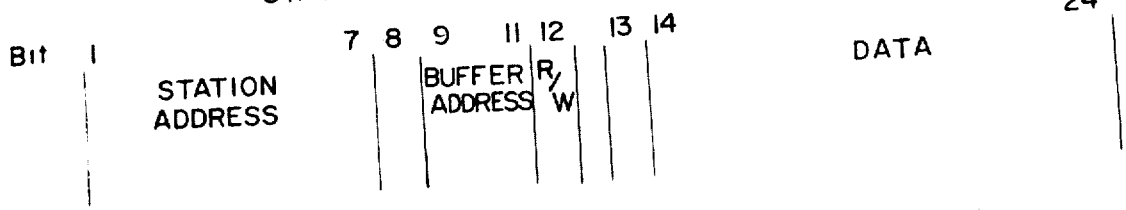
FIGS. 5 and 6 are diagrammatic representations of the data word formats of the station-bound data line and computer-bound data line, respectively.
Figure 6:
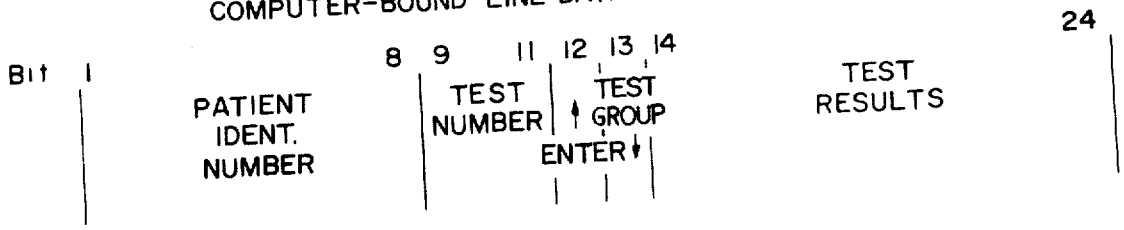

The data word formats for the stations are illustrated in FIGS. 5 and 6, FIG. 5 illustrating the data word format on the station bound line, that is, the format of data being sent from the scanner to the station, while FIG. 6 illustrates the word format of data on the computer bound line being transmitted from the station to the scanner. Referring to FIG. 5, it is seen that bits 1 through 7 of the data word represent the station address, bits 9 through 11 represent the buffer address, bit 12 indicates whether a read operation or write operation is to be performed, bit 13 is a spare, while bits 14 through 24 contain command data for the station. Referring to FIG. 6, the data word format is seen to include bits 1 through 8 which represent the patient identification number, bits 9 through 11 which represent the test number, bit 12 which indicates whether data is to be entered, bit 13 which indicates the test group number, and bits 14 through 24 which represent the test results obtained at the station.

Figure 4:
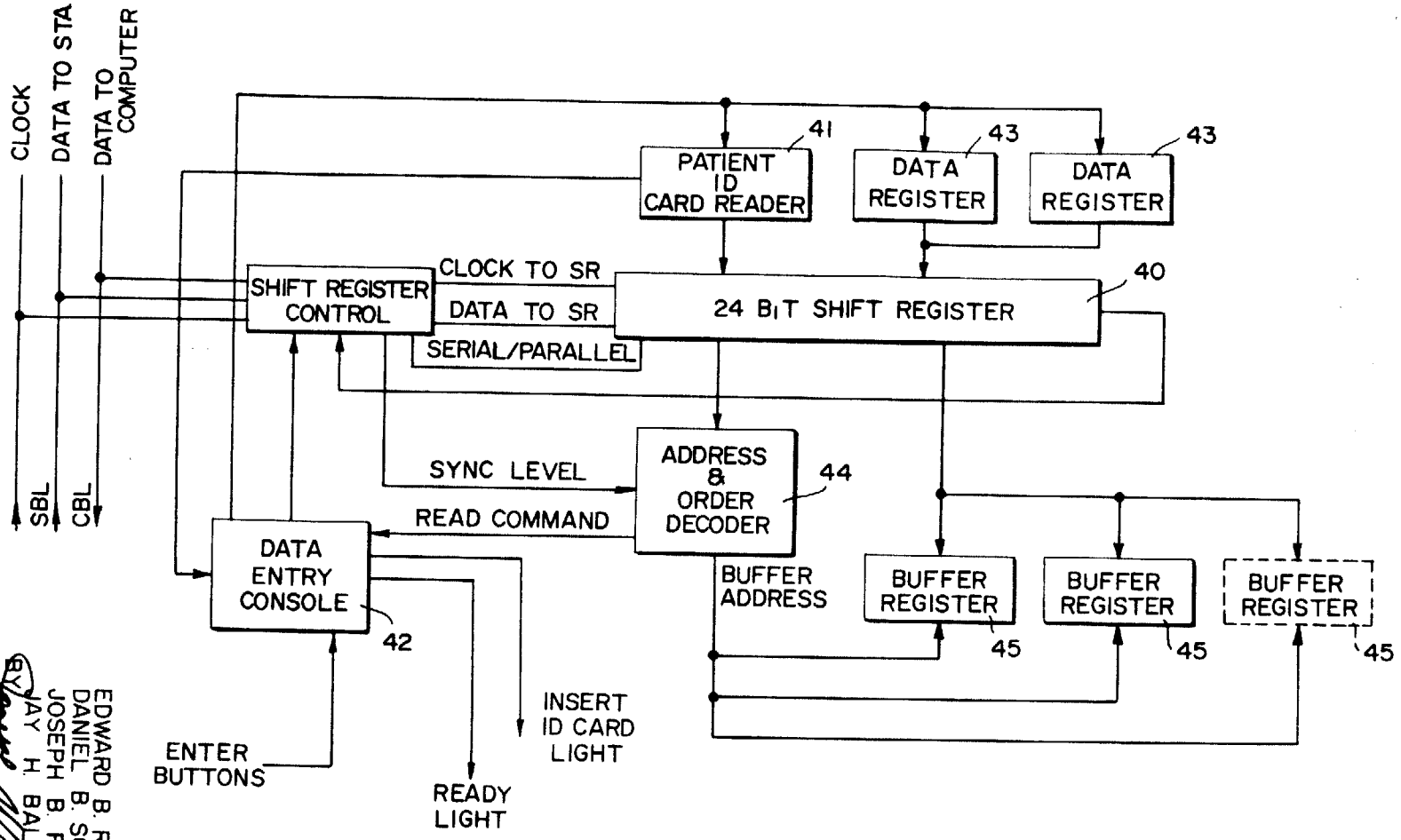
FIG. 4 is a block diagram of the station circuitry.

The station apparatus is shown in FIG. 4 and includes local control means together with logic operative to recognize the station address and to decode messages from the computer. The station can be activated by a manually operable data entry button or by insertion of a patient identification card in the station console to allow data to be loaded into the shift register. Messages from the computer continually run through the shift register; however, no information is processed until the register recognizes its own address and is enabled by the entry command to enter the data. As stated hereinabove, if no data is to be processed, the shift register will, upon recognition of its address, return the transmitted message back to the scaner for station verification. When the station is in use a patient identification number is entered into the requisite bit locations in a 24 bit shift register 40. Patient identification is typically derived from a punched coded card which the patient carries from station to station as he is tested in the medical center. This card is read by card reader 41 and the data so read entered in register 40. Test data is entered into other portions of shift register 40 by means of the data entry console 42 and the data registers 43. The particular means from which data is derived will depend upon the particular station operation, as will be further explained hereinafter. In general, the address and order decoder 44 is operative to recognize a station address and to provide a read command to console 42 to allow data to be decoded and the message receive from the scanner, and to return data to the scanner. Test information derived at the station and to be transmitted back to the scanner is entered by manual entry buttons into shift register 40, or by the test transducers themselves into the data registers 43 for subsequent loading into shift register 40. Information contained in a received message for instructing the station is loaded into the buffer registers 45 for readout to the requisite control circuits of the station.

Figure 9:
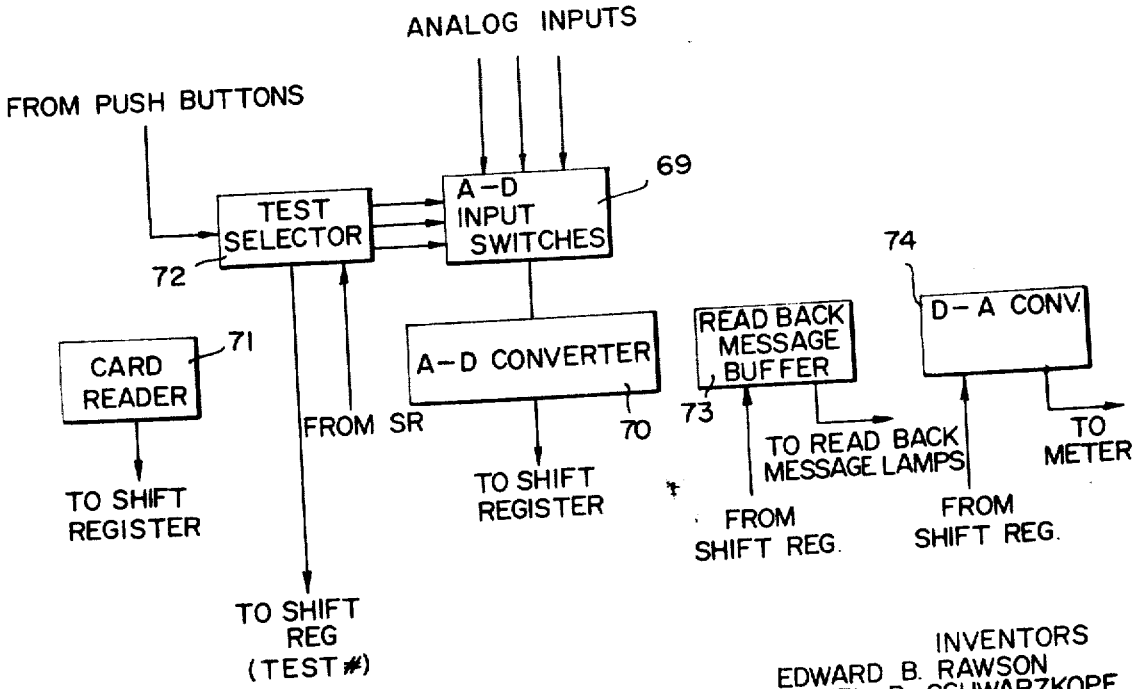
FIG. 9 is a block diagram of the anthropometry station logic circuitry.

The particular data entry configuration for each station depends of course upon the construction and function of the particular station. By way of example, several stations of the types commonly employed in the novel medical screening system are illustrated in FIGS. 7 through 9.

Figure 7A:
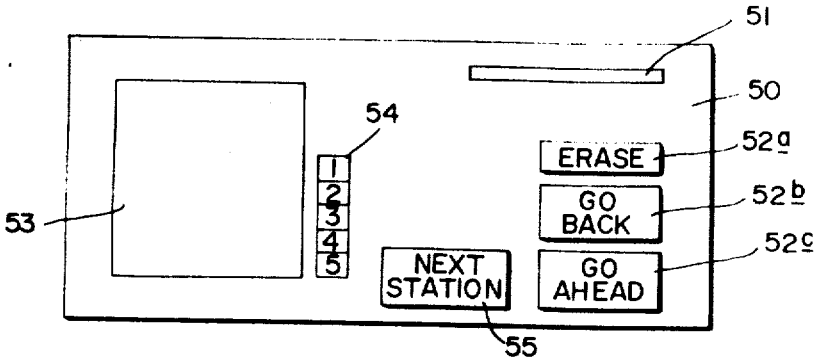
FIGS. 7A and 7B are diagrammatic representations, respectively, of the medical history station console and logic circuitry.
Figure 7B:
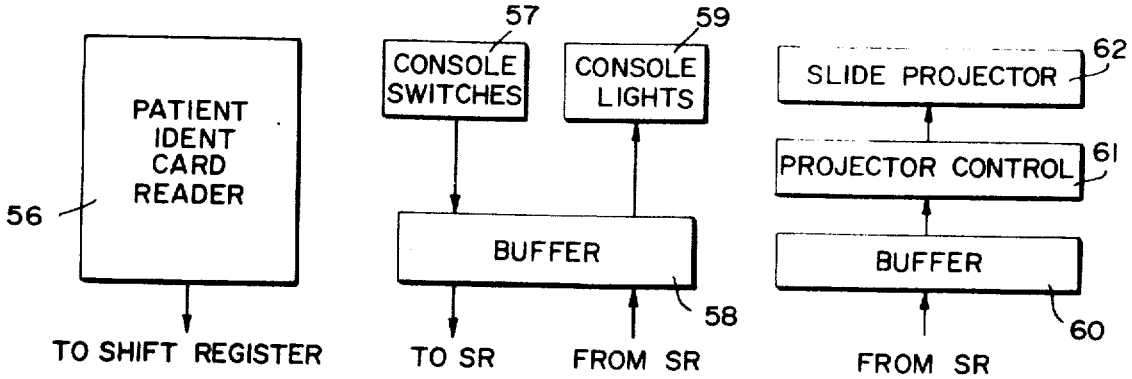

The medical history station is illustrated in FIG. 7, FIG. 7A illustrating the physical arrangement of the station console while FIG. 7B illustrates the logic circuitry employed therewith. The station console 50 includes a slot 51 into which a patient identification card can be inserted for decoding of the patient identification number, station operation buttons 52A, 52B and 52C operative, respectively, to erase an erroneous answer, to cause the presentation of a previous question, or to cause an advance to a succeeding question. Questions are visually presented to the patient on a rear projection screen 53, and a plurality of answer buttons 54 are provided for selection of an answer to a question. Typically, the question appears in the upper portion of screen 53 while the answers appear in the lower portion adjacent to the five answer buttons with which they correspond. A "Next Station" indicator 55 is provided to denote the identity of the station to which the patient is to proceed after completion of the medical history.

In operation, upon insertion of the identity card into slot 51, the patient identification number is decoded by card reader 56 and the decoded output applied to the shift register 40 in the station transceiver (FIG. 4). Insertion of the patient identification card also causes activation of the station transceiver to allow data to be entered into the shift register for processing. Operation of the console switches 57, which includes the switches 52 and 54 of FIG. 7A cause data to be entered into buffer 58 and thence to the requisite bit locations of shift register 40. The presentation of questions during the testing sequence is controlled by information from the scanner stored in shift register 40, this information being transferred by way of buffer 60 to a projector control 61 and thence to slide projector 62 for presentation on screen 53. The patient may request to change his response to a previous question by depressing a switch 52b, by which means the patient's answer to the next previous question is sent by the scanner to shift register 40 and thence via buffer 58 to the console lights 59 which are associated with the answer buttons 54. Thus, this station is in a closed loop configuration with the central processor so that instructions can be given to the patient and his responses processed by the scanner in real time. Based upon the patient load at the several stations, the processor selects the next station to which the patient should proceed and this information is displayed for the patient on the console.

Figure 8A:
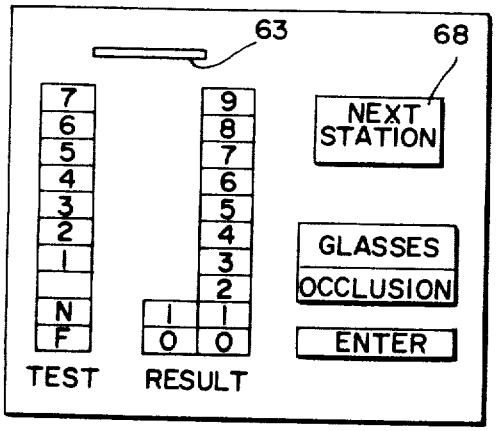
FIGS. 8A and 8B are diagrammatic representations, respectively, of the visual testing station console and logic circuitry.
Figure 8B:
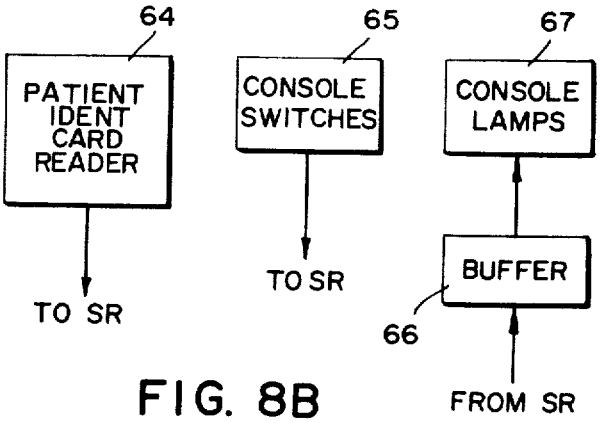

The visual acuity station is illustrated in FIG. 8, FIG. 8A illustrating the physical arrangement of the testing console while FIG. 8B illustrates the logic circuitry associated therewith. In this type of station, the test itself is conducted by use of a conventional instrument, such as a Bausch and Lomb Ortho-Rater, and the patient's responses to the tests are manually entered in the console illustrated in FIG. 8A. In operation, the patient identification card is again inserted in slot 63 and the decoded identification number read by card reader 64 is entered into shift register 40. The test number and the numbers representing the test results are entered by depressing the requisite console switches 65 which cause entry of the requisite switch position data into shift register 40. Data from the scanner stored in shift register 40 is applied via buffer 66 to the console lamps 67, such as the Next Station lamp 68 which, as before, indicates the station to which the patient should next proceed.

The logical circuitry of the anthropometry station is illustrated in FIG. 9 and includes apparatus for encoding analog signals derived from the test transducers. The height and weight of a patient are measured, as are the relative front-back and left-right weight distributions. Analog signals representative of these measurements are applied to input switches 69 and thence to analog to digital converter 70. The digital outputs of converter 70 are applied to shift register 40 of the station transceiver. As in the stations described hereinabove, a card reader 71 is employed to decode the patient identification number and apply this number to shift register 40. The test number is entered into the shift register by manually actuable pushbuttons connected to a test selector circuit 72. In formation in the shift register is stored in message buffer 73 for presentation to the console lamps, and information may be converted back to analog form in digital to analog converter 74 for energization of suitable visual indicators.

The other test stations are implemented and are operative similarly, varying, of course, in the particulars necessary to suit the individual station function.

Various modifications and alternative implementations will occur to those versed in the art without departing from the spirit and true scope of the invention. For example, the logic circuitry and station consoles can be implemented in a variety of ways, as can the transmission link employed between the scanner and the stations. Accordingly, it is not intended to limit the invention by what has been particularly shown and described, except as in-indicated in the appended claims.

What is claimed is:

1. A medical screening system in which medical data concerning a patient is derived by suitable transducers and transmitted and processed in real time to produce a medical history and workup of the patient, said system comprising:

a central processor including a computer and a scanner;

a plurality of medical test stations each operative to obtain selected different medical data concerning a patient and to convey such data to said central processor, selected ones of said test stations being adaptively operative in accordance with instructions from said central processor; and output means coupled to said scanner and operative to provide a visual representation of the medical history and workup of a patient derived from said test stations;

said scanner including:

address generating means for providing sequentially the address of each of said test stations;

means operative in response to each of said addresses to provide particular data for the test station associated with each said address;

means for compiling each address and associated station data into a distinct message and for transmitting said message to said station;

means operative in response to a respective identifying signal returned from each station to compare each station address with its identifying signal; and means operative in the absence of correlation between a station address and its identifying signal to indicate station inoperability;

each medical test station including:

a console having controls and indicators suitable for conducting a particular medical test;

patient identification means for providing a coded representation of patient identity;

a transceiver having means operative to encode test information into a format suitable for said central processor, means operative to recognize an address code unique to its station, means operative upon address recognition to decode data from said scanner, and means for transmitting said encoded test information to said scanner; and means operative after transmission of data by said transceiver to said scanner to provide an indication of the next test station to which a patient should proceed.

2. A medical screening ssytem according to claim 1 wherein at least one of said test stations is a medical history taking station in which questions are propounded for answer by a patient and the questioning sequence is adaptively conducted in accordance with patient responses, said scanner being communicative with said history taking station throughout the questioning sequence to receive answer data from said station and to provide control data to said station.

3. A medical screening ssytem according to claim 1 wherein said test stations include one or more stations having a test console with a plurality of manual data entry switches thereon.

4. A medical screening system according to claim 1 wherein said test stations each include:

a shift register;

shift register control means coupled to said transmission path and operative to convey messages from said scanner to said shift register and to convey data in said shift register to said scanner;

a card reader for decoding a patient identification card and for providing the coded patient identification data to said shift register;

data register means coupled to said shift register;

data entry means for entering medical test data into said data register means;

address decoding means operative to recognize the station address received from said scanner and upon such recognition and upon receipt of patient identification data from said card reader to permit the entry of test data from said data entry means to said data register means and thence to said shift register; and buffer register means coupled to said shift register and operative to receive station instruction data from said scanner.

5. A medical screening system according to claim 1 wherein said test station transceiver includes means for returning said identifying signal to said scanner when said transceiver receives its address code and does not have data for transmission to said scanner.

6. A medical screening system according to claim 5 wherein said identifying signal is said address code.

7. A medical screening system according to claim 1 wherein said test stations are of three classes:

one class of test station being in communication with said scanner throughout a testing sequence for control of said sequence in accordance with patient responses;

a second class of test station having an analog transducer for providing an electrical signal representative of medical test data, and a converter for converting said signal to digital form for transmission to said scanner;

a third class of test station having a data entry console including manually operable switches;

said second and third classes of test station being in communication with said scanner after completion of a medical test.

8. A medical screening system according to claim 1 wherein said transceiver includes means for assembling said encoded test information with said patient identity code into a message for transmission to said scanner.

9. A medical screening system according to claim 8 wherein said patient identification means includes means for activating said transceiver upon recognition of a valid patient identity code.

10. A medical screening system according to claim 8 wherein said patient identification means includes a patient identity card containing coded identity data, and means operative in response to a valid identity code on said card to activate said transceiver.

11. A medical screening system according to claim 1 wherein:

said transmission means includes three transmission lines, each terminated in a suitable load, one of said lines carrying clock pulses, the second of said lines carrying data from said central processor to said test stations, and the third of said lines carrying data from said test stations to said central processor.

*12. A medical screening system in which medical data concerning a patient is derived by suitable transducers and transmitted and processed in real time to produce a medical history and work-up of the patient, said system comprising:*

*a central processor including a computer and a scanner;*

*a plurality of medical test stations each operative to obtain selected different medical data concerning a patient and to convey such data to said central processor, selected ones of said test stations being adaptively operative in accordance with instructions from said central processor; and*

*output means coupled to said central processor and operative to provide a visual representation of the medical history and work-up of a patient derived from said test stations;*

*said scanner including:*

*means for providing sequentially the address of each of said test stations;*

*means for providing particular data for the test station associated with each address; and*

*means for compiling each address and associated station data into a distinct message and for transmitting said message to said station;*

*each medical test station including:*

*a console having controls and indicators suitable for conducting a particular medical test;*

*patient identification means for providing a coded representation of patient identity; and*

*a transceiver having means operative to encode test information into a data format suitable for said central processor, means operative to recognize an address code unique to its station, means operative upon address recognition to decode data from said scanner and means for transmitting said encoded test data to said scanner.*

*13. The medical screening system of claim 12 wherein: said central processor is operative in response to test data from one or more of said medical test stations to retransmit to said medical test stations data indicative of test results at that station; said one or more medical test stations having means to receive said retransmitted data and to provide a display indicative of the test results represented by the retransmitted data.*

*14. A medical multiphasic screening system comprising:*

*a central processor including*

*scanning means for transmitting messages to test stations and for receiving information therefrom and having*

*address means for sequentially providing addresses of each of a plurality of test stations in a preselected sequence; and*

*a computer having*

*message storing memory means actuable in response to each address from said address means to provide messages relating to the entry of data at the station associated with each address;*

*output means for providing patient medical records in tangible form; and*

*a plurality of test stations in continuous communication with said central processor for interrogation thereby, each test station having*

*identification decoding means for providing a coded representation of patient identity and for generating an electronic signal representing said patient identification;*

*data entry means for entering and storing selected medical test data concerning a patient;*

*means for encoding and for transmitting to said central processor said test data and said patient identification;*

*address decoding means for recognizing an address code unique to a station and for generating a responsive actuating signal, whereby said means for encoding and transmitting said test data and said patient identification is actuated only upon generation of said actuating signal.*

*15. A medical multiphasic screening system comprising a central processor and a plurality of test stations in continuous communication with said central processor, said central processor comprising:*

*a computer for assembling input data to produce individual patient medical records;*

*output means for providing a tangible data record;*

*a scanner including an address means for sequentially generating the addresses of said plurality of test stations; and*

*message storage means for storing station bound messages for transmission when actuated by said address means;*

*each test station comprising:*

*identification decoding means for providing a coded representation of patient identity and for generating an electronic signal uniquely representative thereof;*

*data entry means for entering test data by generating a signal indicative of test data results;*

*address decoding means responsive to only one of the test station addresses generated by said address means for providing an actuation signal; and*

*means for encoding and transmitting said coded representation of patient identity and said test data to said scanner upon actuation by said address decoding means.*

*16. A medical multiphasic screening system comprising a central processor and a plurality of test stations in continuous, on-line, time-shared communication with said central processor, said central processor comprising:*

*computer means for providing a time-shared data link with said plurality of test stations and operative to assemble data from each of said stations into individual patient medical records and to provide data from said computer means to each of said stations;*

*a plurality of medical test stations, each operative to obtain selected different medical data concerning a patient and to convey such data to said computer means, each medical test station including:*

*a console having controls and indicators suitable for conducting a particular medical test;*

*means for providing a coded representation of patient identity;*

*means operative to encode test information into a data format suitable for said computer means;*

*means operative to recognize an address code in data received from said computer means; and*

*means operative upon address code recognition for transmitting said encoded test information to said computer means;*

*and wherein said test stations include:*

*one class of test station being in communication with said computer means throughout a testing sequence for control of said sequence by said computer means in accordance with patient responses; and*

*a second class of test station having means for providing electrical signal indications of medical test data and being in communication with said computer means after completion of a medical test; and*

*output means coupled to said computer means and operative to provide a tangible version of said patient medical records.*

References Cited

The following references, cited by the Examiner, are of record in the patented file of this patent or the original patent.

UNITED STATES PATENTS

| | | | |
|---|---|---|---|
| 3,283,304 | 11/1966 | Sinn et al. | 340—152 |
| 3,296,597 | 1/1967 | Scantlin et al. | 340—172.5 |
| 3,327,292 | 6/1967 | Eriksson et al. | 340—172.5 |
| 3,396,372 | 8/1968 | Calvert | 340—172.5 |
| 3,400,378 | 9/1968 | Smith et al. | 340—172.5 |
| 3,403,382 | 9/1968 | Frielinghaus et al. | 340—172.5 |
| 3,405,393 | 10/1968 | Haselwood | 340—172.5 |
| 3,407,387 | 10/1968 | Looschen et al. | 340—152 |
| 3,436,732 | 4/1969 | Charters | 340—172.5 |
| 3,438,019 | 4/1969 | Gowan | 340—172.5 |

HARVEY E. SPRINGBORN, Primary Examiner

UNITED STATES PATENT OFFICE
CERTIFICATE OF CORRECTION

Patent No. RE 27,580 Dated February 6, 1973

Inventor(s) Edward B. Rawson, Daniel B. Schwarzkopf, Joseph B. Ferguson, Jay H. Ball It is certified that error appears in the above-identified patent and that said Letters Patent are hereby corrected as shown below:

Column 5, line 7, "PDP-81" should read --PDP-8I--;

Column 8, line 38, "scaner" should read --scanner--;

Column 9, lines 69 and 70, "In formation" should read --In-formation--;

Column 10, line 59, "ssytem" should read --system--; and

Column 10, line 68, "ssytem" should read --system--.

USCOMM-DC 60376-P69
* U.S. GOVERNMENT PRINTING OFFICE : 1969 O—366-334.

UNITED STATES PATENT OFFICE

CERTIFICATE OF CORRECTION

Patent No. RE 27,580 Dated February 6, 1973

Inventor(s) Edward B. Rawson, Daniel B. Schwarzkopf, Joseph B. Ferguson, Jay H. Ball It is certified that error appears in the above-identified patent and that said Letters Patent are hereby corrected as shown below:

Add the following references cited:

1. Collen, Morris F., Multiphasic Screening as a Diagnostic Method in Preventive Medicine, Methods of Information in Medicine, Vol. IV:2, June, 1965, pages 71-74.

2. Bates, Richard C., Get Ready for Mass Health Screening!, Medical Economics, October 16, 1967, pages 75-83.

3. Collen, Morris F., et al, Automated Multiphasic Screening and Diagnosis, American Journal of Public Health, Vol. 54, No. 5, May, 1964, pages 741-750.

4. Slack, Warner V., et al, A Computer-Based Physical Examination System, Journal of the American Medical Association, Vol. 200, No. 3, April 17, 1967, pages 136-140.

Signed and sealed this 28th day of August 1973.

(SEAL)
Attest:

EDWARD M.FLETCHER,JR.
Attesting Officer

RENE D. TEGTMEYER
Acting Commissioner of Patents